United States Patent
Kuenzner

(10) Patent No.: US 8,862,308 B2
(45) Date of Patent: Oct. 14, 2014

(54) PROCESS FOR OPERATING A DIALOGUE SYSTEM FOR A MOTOR VEHICLE

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 522 days.

(21) Appl. No.: 12/761,308

(22) Filed: Apr. 15, 2010

(65) Prior Publication Data

US 2010/0198451 A1     Aug. 5, 2010

Related U.S. Application Data

(63) Continuation of application No. PCT/EP2008/008744, filed on Oct. 16, 2008.

(30) Foreign Application Priority Data

Oct. 25, 2007   (DE) .................... 10 2007 051 013

(51) Int. Cl.
*G06F 7/00*     (2006.01)
*B60K 37/06*    (2006.01)

(52) U.S. Cl.
CPC ......... *B60K 37/06* (2013.01); *B60K 2350/1016* (2013.01)
USPC .......................................... 701/29.1; 345/172

(58) Field of Classification Search
USPC ................................... 701/29, 29.1; 345/172
See application file for complete search history.

(56) References Cited

U.S. PATENT DOCUMENTS

| | | | |
|---|---|---|---|
| 4,839,640 A * | 6/1989 | Ozer et al. | 340/5.33 |
| 5,270,689 A | 12/1993 | Hermann | |
| 6,104,319 A * | 8/2000 | Shpater | 341/23 |
| 6,374,177 B1 * | 4/2002 | Lee et al. | 701/200 |
| 6,441,806 B1 * | 8/2002 | Jaeger | 345/172 |
| 6,903,288 B2 * | 6/2005 | Varga | 200/200 |
| 7,062,362 B2 * | 6/2006 | Obradovich et al. | 701/1 |
| 7,123,972 B2 | 10/2006 | Lee | |
| 7,124,302 B2 * | 10/2006 | Ginter et al. | 713/189 |

(Continued)

FOREIGN PATENT DOCUMENTS

| | | |
|---|---|---|
| DE | 38 36 555 A1 | 5/1990 |
| DE | 198 07 410 A1 | 8/1999 |
| DE | 101 25 165 A1 | 10/2002 |
| DE | 102 29 890 A1 | 1/2004 |
| DE | 102 37 725 A1 | 2/2004 |
| DE | 103 52 057 A1 | 1/2005 |
| DE | 10 2004 014 390 A1 | 10/2005 |
| DE | 10 2005 030 361 A1 | 3/2006 |
| DE | 10 2004 058 954 A1 | 6/2006 |
| DE | 10 2004 058954 A1 | 6/2006 |
| WO | WO98/09847 A1 | 3/1998 |
| WO | WO2004/005065 A1 | 1/2004 |

OTHER PUBLICATIONS

German Search Report dated Dec. 5, 2011 with one page of degree of relevance (six (6) pages).

*Primary Examiner* — Tuan C. To

(74) *Attorney, Agent, or Firm* — Crowell & Moring LLP

(57) ABSTRACT

In a dialog system for a motor vehicle having a plurality of control keys of which at least one can be occupied by several functions, one such control key can be occupied by several functions of a hierarchical menu structure that, when the control key is operated, as a function of an operating status of a use system coupled with the dialog system, precisely one of several functions is executed, and the occupation of the at least one control key by several functions takes place in that certain functions of the menu structure are assigned to a function group comprising several functions, and in that the control key is occupied by all functions assigned to the function group when one of the functions assigned to the function group is allocated to the control key by an operating action of the user.

21 Claims, 2 Drawing Sheets

(56) References Cited

U.S. PATENT DOCUMENTS

| | | | |
|---|---|---|---|
| 7,138,978 B2 * | 11/2006 | Ohgitani | 345/156 |
| 7,457,755 B2 * | 11/2008 | Konig | 704/275 |
| 7,467,037 B2 | 12/2008 | Donk et al. | |
| 7,599,712 B2 * | 10/2009 | van der Meulen | 455/556.1 |
| 7,612,765 B2 * | 11/2009 | Wernersson | 345/168 |
| 7,802,198 B2 * | 9/2010 | Obradovich | 715/790 |
| 8,079,766 B2 * | 12/2011 | Kinney | 400/489 |
| 8,165,741 B2 * | 4/2012 | Roberts et al. | 701/29.1 |
| 2003/0067495 A1 * | 4/2003 | Pu et al. | 345/811 |
| 2005/0076308 A1 | 4/2005 | Mansell et al. | |
| 2006/0082435 A1 * | 4/2006 | Matsumoto et al. | 340/5.23 |
| 2007/0016370 A1 | 1/2007 | Kuenzner | |
| 2007/0040649 A1 * | 2/2007 | Dulgerian et al. | 340/5.64 |
| 2007/0242050 A1 | 10/2007 | Kuenzner et al. | |
| 2008/0316180 A1 * | 12/2008 | Carmody et al. | 345/172 |

* cited by examiner

PROCESS FOR OPERATING A DIALOGUE SYSTEM FOR A MOTOR VEHICLE

CROSS-REFERENCE TO RELATED APPLICATIONS

This application is a continuation of PCT International Application No. PCT/EP2008/008744, filed Oct. 16, 2008, which claims priority under 35 U.S.C. §119 from German Patent Application No. DE 10 2007 051 013.8, filed Oct. 25, 2007, the entire disclosures of which are herein expressly incorporated by reference.

BACKGROUND AND SUMMARY OF THE INVENTION

The invention relates to a process for operating a dialog system for a motor vehicle having a plurality of control keys of which at least one can be occupied by several functions of a hierarchical menu structure.

It is known to provide control keys in the interior of motor vehicles by which certain functions can be triggered in a very rapid and easy manner. However, for reasons of design and cost, among others, the number of such control keys is to be kept within narrow limits.

For reducing the number of keys, the possibility of operating a plurality of functions integrated in a menu structure by means of a multifunctional control unit, which may be constructed as a rotating or push actuator, is known from German Patent Document DE 38 36 555 A1. However, also in the case of such dialog systems, certain functions typically remain controllable additionally or exclusively by way of control keys.

Furthermore, a use of individual control keys for several functions respectively is known for reducing the number of control keys. For example, it is known to configure a dialog system on the manufacturer side such that, in the radio operation, a certain control key is used as a station key for a radio station, while, in the audio DC operation, it is used for selecting several CDs. However, such dialog systems configured on the manufacturer side rarely fulfill the use habits and preferences of all users.

One aspect of the invention is to create a process of the above-mentioned type which permits the taking into account of an operator's use habits and/or preferences. This object may be achieved by the process of Claim 1. Advantageous embodiments and further aspects of the invention are recited in the dependent claims.

A user may be provided with the possibility of supporting his personal use habits and preferences by a suitable key occupation. Simultaneously, the number of required control keys is minimized or reduced by the multiple occupations according to the invention.

In order to better fulfill a user's use habits and preferences, it had been known, for example, from German Patent Document DE 10 2004 058 954 A1, to allow a free occupation of control keys to be initiated by a user. However, in the case of such free occupation control keys, multiple occupation of a single control key has been avoided, particularly in order to avoid having the user become confused. Specifically, it would be irritating for most users if a key occupation that had previously been initiated by the user himself were suddenly no longer available at a later point in time and a different function were unexpectedly carried out when the control key is operated. In addition, in the case of a plurality of known dialog systems, it may be desired for a function by which a control key had been occupied to be available in all dialog statuses of the system. For example, it may be desirable for the destination routing to a navigation address to be triggerable, or especially be triggerable when the user is currently not in the navigation menu, because the user will thereby save more time.

In accordance with the principles of the invention, a multiple occupation of free-occupation control keys is provided, and in particular for special, mutually-related functions. In addition, from the user's point of view, the occupation should take place in an especially simple manner.

A multiple occupation of free-occupation control keys becomes possible according to the invention by those functions of the menu structure of the dialog system which are assigned to a function group that includes several functions. The corresponding assignment of certain functions of the menu structure to the function groups preferably takes place on the manufacturer side or in the development process.

Such function groups typically comprise mutually closely-related functions. In particular, the relationship may consist of the fact that the functions are mutually inverse; i.e. that the implementation of one function cancels or reverses the result of the implementation of another function of the same function group. For example, a switch-on function relative to a use system coupled with the dialog system and the pertaining switch-off function relative to the same use system can be part of one function group. Another example of potential members of a function group is different adjusting functions for adjusting one and the same use parameter.

Which of the functions is to be used in the current situation may be decided according to the invention as a function of an operating status of a use system coupled with the dialog system, preferably, as a function of an operating status of a use system to which all functions of the function group relate. Such an operating status may be the switch-on status of the use system.

From the user's point of view, the occupation of a control key by several functions will be particularly simple in that, according to the invention, the control key is automatically occupied by all functions assigned to a function group when, as a result of the user's operating action, one of the functions assigned to this function group is allocated to the control key. In certain embodiments, a single assignment of a function may therefore be sufficient for the allocation of all members of the function group.

The allocation of the single function which, according to the invention, is allocated to the control key may, for example, take place in a manner known per se in that the control key is pressed by the user for a continuous duration while the function is implemented and/or while a menu entry concerning the function is selected, for example, by a cursor or a similar selecting element.

After the occupation, the selection as to which of the functions by which the control key is occupied when the control key is operated may take place exclusively as a function of operating statuses of the use system coupled with the dialog system, thus independently of other influences. In particular, the selection may take place independently of the dialog status of the dialog system. It may therefore, for example, not be important whether the user is currently in a radio menu or a navigation menu. Independently thereof, an operation of the control key results in the implementation of a function which depends exclusively on the above-mentioned operating status of the use system. If, for example, in the case of such an implementation of the invention, a control key is occupied by the switching-on and/or the switching-off of the analysis of traffic program signals (TP), this switching-on and/or switching-off can also be carried out at any time by means of the control key when the operator is currently in a navigation menu. Which function (switching-off or switching-on) is carried out depends exclusively on whether the analysis of TP signals is currently activated or deactivated.

According to one or more embodiments of the invention, at least one of the control keys can be occupied by a switch-on function relative to the use system and a switch-off function inverse thereto that, when the control key is operated while the use system is switched on, the switch-off function will be carried out and that, when the control key is operated while the use system is switched off, the switch-on function will be carried out.

For the implementation of the above-mentioned dependence on the status (use system switched on vs. use system switched off), the current switch-on status of the use system coupled with the dialog system may be determined on the basis of a status model of the use system comprising the switch-on status. The dialog system therefore does not have to carry out an actual query of the switch-on status of the use system. As the simplest conceivable status model, for example, a status flag already maintained at the dialog system is sufficient, which status flag is set when the switch-on function is triggered and is canceled when the switch-off function is carried out.

According to other preferred variants of the present invention, however, the current operating status of the use system may be actually queried from the use system by the dialog system and/or the current operating status is independently or autonomously transmitted or reported by the use system to the dialog system. These variants are particularly advantageous when the current operating status of the use system cannot be determined in a model-based manner by the dialog system by means of simple devices, possibly because it can also change independently of an operation of the control key.

It should further be appreciated that at least one control key can be occupied by a plurality of adjusting functions for adjusting a use parameter of the use system such that, when the control key is operated, an adjusting function is implemented that, in a sequence of adjusting functions, follows that adjusting function according to which the use parameter is currently adjusted. In particular, the sequence can also be cyclically defined; i.e., the last adjusting function from a limited number of adjusting functions, will be followed again by the first adjusting function (for example, function 1-function 2-function 3-function 4-function 1-function 2-function 3-function 4-function 1- . . . ).

The sequence may particularly be stored at the dialog system. It may also already be the result of a manner of storing the functions of the function group, which preferably also takes place at the dialog system. In particular, the sequence may be the result of the memory locations of the data pertaining to the individual functions of the function group in a memory unit of the dialog system. However, in addition to the functions of the function group per se, a sequence of the latter may also be stored at the dialog system.

In one or more embodiments, the dialog system may determine the current adjustment of the use parameter on the basis of a status model of the use system which comprises data concerning this adjustment. For example, the last-executed adjusting function may be determinable by means of a position number relative to the above-mentioned sequence from the status model. The status model may then again be very simple; in the simplest case, it should comprise only the position number of the last-executed adjusting function as well as the mentioned sequence. If the status model is correctly initialized, these data will be sufficient for determining which adjusting function is to be carried out during the next operation of the control key.

The case of the occupation of a control key by two different adjusting functions is particularly clear. For example, at least one of the control keys can be occupied such by a first adjusting function for adjusting a use parameter of the use system and a second adjusting function for adjusting the use parameter that, when the control key is operated, the second adjusting function is executed when the use parameter is adjusted according to the first adjusting function, and that, when the control key is operated, the first adjusting function is executed when the use parameter is adjusted according to the second adjusting function. On the implementation side, this implementation can be handled essentially like the above-described case of the multiple occupations by a switch-on function and a switch-off function inverse thereto.

The invention may be particularly advantageously applicable in connection with a dialog system in which the current occupation of the free-occupation control keys can be displayed, particularly visually displayed, upon a user's prompting action. The prompting action may consist, for example, of a slight touching of the control key, of a slight touch-selecting of the control key or of an approaching of the control key by the user's hand if the dialog system is suitable for detecting such a touch, such a touch-selecting and/or such an approach.

In the case of control keys occupied by a function group, the display may contain information as to which of the functions of the function group will be executed during the next operation of the key. When the function group therefore comprises the switching-on and the switching-off of the analysis of traffic program signals (TP), the display may contain the information as to whether TP signals are switched off or are switched on by the operation.

As an alternative, the display may also contain information as to which of the functions of the function group is currently having an active effect on the use system. This may be synonymous with a display of the operating status of the use system on which it depends which of the functions is executed when the control key is operated. Thus, when the function group comprises the switching-on and switching-off of the analysis of traffic program signals (TP), according to this alternative, the display may contain the information as to whether TP signals are currently analyzed.

However, in principle, such a display can also take place solely on the basis of the function group and its members. Thus, the user can also be provided in this manner with useful information concerning the occupation of the control key. In the above-mentioned case, information of the "TP on/off" type can therefore also simply be displayed.

The dialog system may be constructed such that, upon a first prompting action by the user (for example, touching a control key), first short information concerning the control key can be displayed and, upon a second prompting action by the user (for example, maintaining the touch for 2 seconds), detailed information can be displayed. Additionally, information may be displayed solely on the basis of the function group and its members (in the above example, "TP on/off").

In contrast, the detailed information may contain information as to which of the functions of the function groups will be executed during the next operation of the key and/or which of the functions of the function group currently has an active effect on the use system.

If the operating status of the use system cannot be determined, or can be determined only very slowly in a model-based manner, the time that elapses between the display of the short information and of the detailed information can be utilized for determining the operating status.

Other objects, advantages and novel features of the present invention will become apparent from the following detailed description of one or more preferred embodiments when considered in conjunction with the accompanying drawing.

DETAILED DESCRIPTION OF THE DRAWINGS

A motor vehicle comprises a menu-based dialog system by means of which an air-conditioning system, a stereo system with a radio and other audio sources, a navigation system and a mobile telephone can be controlled.

The operation of the dialog system 50 can optionally take place by a rotating/push actuator or eight control keys 60 that can be freely occupied. A video screen 70 displays the respectively current menu 80 as a list of the submenus reachable from this menu and/or of the functions that can be triggered from there.

By means of the rotating/push actuator, the user can, among other things, move a selecting element constructed as a cursor in the currently displayed menu.

In a manner known per se, the control keys can be occupied by navigation destinations, telephone numbers, radio stations and audio sources.

In addition, function groups are filed with the dialog system. The dialog system will support a multiple occupation of the control keys exclusively for the functions of these function groups. Below are three examples of function groups that would be consistent with the principles of the invention.

A first function group comprises the switching-on of the analysis of traffic program signals (TP) and the switching-off of the analysis of traffic program signals.

A second function group comprises the activation of a first air-conditioning program, the activation of a second air-conditioning program and the activation of a third air-conditioning program. The three air-conditioning programs mutually exclude one another; when one of the programs is activated, a currently implemented air-conditioning program will be terminated.

A third function group comprises the parameterization of the map view of the navigation system as pointing to the north and the parameterization of the map view of the navigation system as pointing in the direction of the drive.

Figure 1:
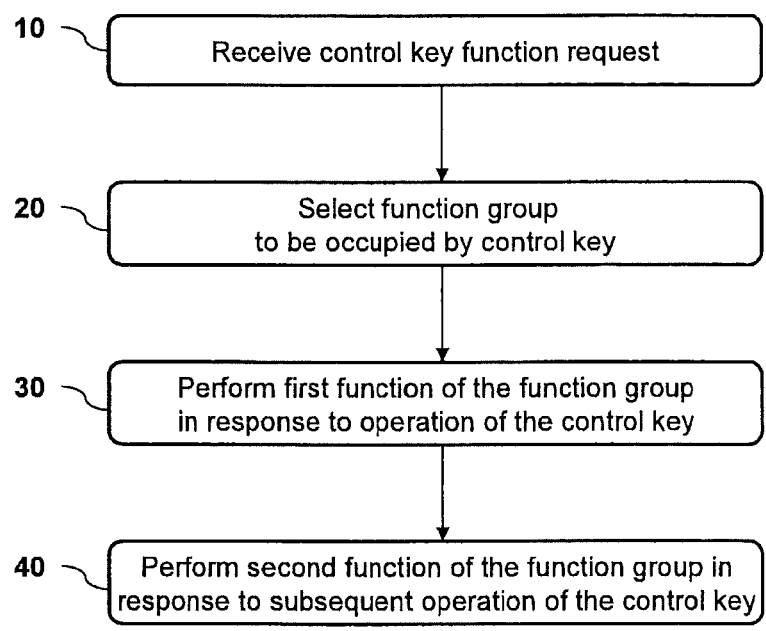
FIG. 1 depicts a process for implementing one or more aspects of the invention.
Figure 2:
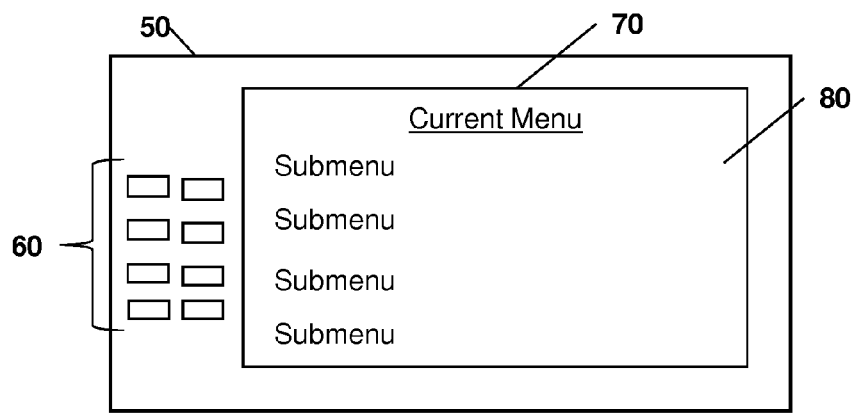
FIG. 2 depicts a dialogue system for carrying out the process of FIG. 1.

The driver can cause the occupation of each of the control keys by all functions of the first function group when the key is pressed for a continuous duration (block 10 of FIG. 1) while, by means of the cursor, a function is highlighted which relates to the switching-on or switching-off of the analysis of TP signals (block 20 of FIG. 1).

When a control key has thus been caused to be occupied by all functions of the first function group, by means of its operation, the analysis of TP signals will be activated if it is currently deactivated (block 30 of FIG. 1), and it will be deactivated if it is currently activated (block 40 of FIG. 1).

The driver can cause the occupation of each of the control keys by all functions of the second function group when the key is pressed for a continuous duration (block 10 of FIG. 1) while, by means of the cursor, a function is highlighted which relates to the activation of one of the three air-conditioning programs (block 20 of FIG. 1).

When a control key has thus been caused to be occupied by all functions of the second function group, by means of its operation, the first air-conditioning program will be activated if previously none of the three air-conditioning programs had been activated or if previously the third air-conditioning program had been activated (block 30 of FIG. 1); the second air-conditioning program will be activated if previously the first air-conditioning program had been activated (block 40 of FIG. 1); and the third air-conditioning program will be activated if previously the second air-conditioning program had been activated.

The driver can cause the occupation of each of the control keys by all functions of the third function group when the key is pressed for a continuous duration (block 10 of FIG. 1) while, by means of the cursor, a function is highlighted which relates to the parameterization of the map view of the navigation system as pointing to the north and the parameterization of the map view of the navigation system as pointing in the direction of the drive or as pointing to the north (block 20 of FIG. 1).

When a control key has thus been caused to be occupied by all functions of the third function group, by means of its operation, the map view of the navigation system will be parameterized as pointing to the north if it had previously been parameterized as pointing in the direction of the drive (block 30 of FIG. 1), and it will be parameterized as pointing in the direction of the drive if it had previously been parameterized as pointing to the north (block 40 of FIG. 1).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a dialog system for a motor vehicle having a plurality of control keys comprising the acts of:

occupying, by the dialog system and in response to an operating action of one of the plurality of control keys by a user of the motor vehicle, said one of the plurality of control keys with several related functions of a hierarchical menu structure, where such several related functions are assigned to a function group; and executing, by the dialog system in response to a further operation of said control key, one of the several related functions which is selected from the function group based on an operating status of a use system in the motor vehicle and coupled with the dialog system, wherein the control key is occupied by all of the several related functions assigned to the function group when any one of the several related functions assigned to the function group is allocated to the control key by said operating action of the user.

2. The method of claim 1, further comprising determining, by the dialog system, an operating status of the use system on the basis of a status model of the use system comprising the operating status.

3. The method of claim 2, further comprising determining, by the dialog system, the operating status of the use system by querying the use system.

4. The method of claim 1, wherein the use system automatically transmits the operating status to the dialog system.

5. The method of claim 1, wherein occupying, by the dialog system, one of the plurality of control keys comprises occupying, by the dialog system, said control key with a switch-on function relative to the use system and with a switch-off function inverse thereto such that, when the control key is operated while the use system is switched on, the switch-off function will be executed, and that, when the control key is operated while the use system is switched off, the switch-on function will be executed.

6. The method of claim 1, wherein occupying, by the dialog system, one of the plurality of control keys comprises occupying, by the dialog system, said control key with a plurality of adjusting functions for adjusting the use parameter such that, when the control key is operated, that adjusting function in a sequence of adjusting functions stored at the dialog system will be executed that follows the adjusting function according to which the use parameter is currently adjusted.

7. The method of claim 1, wherein occupying, by the dialog system, one of the plurality of control keys comprises occupying, by the dialog system, said control key with a first adjusting function for adjusting the use parameter and with a second adjusting function for adjusting the use parameter such that, when the control key is operated, the second adjusting function will be executed when the use parameter is adjusted according to the first adjusting function, and when the control key is operated, the first adjusting function will be executed when the use parameter is adjusted according to the second adjusting function.

8. The method of claim 1, wherein the use system comprises at least one of an air-conditioning system, a stereo system with a radio and other audio sources, and a navigation system.

9. A method for operating a dialog system for a motor vehicle having a plurality of control keys comprising the acts of:
receiving, by a dialog system, a request from a user of the motor vehicle to occupy a control key from the plurality of control keys with a requested function of a hierarchical menu structure, where the function is assigned to a function group of related functions and wherein the request is provided by user operation of the control key;
selecting, by the dialog system, the function group, to which the selected function has been assigned, to occupy the control key;
determining, by the dialog system, an operating status of a use system in the motor vehicle that is coupled to the dialog system;
performing, by the dialog system, a first function of the function group in response to a first operation of the control key by the user, wherein the first function is selected based at least in part on the determined operating status of the use system; and
performing, by the dialog system, a second function of the function group in response to a second operation of the control key by the user.

10. The method of claim 9, wherein selecting, by the dialog system, the function group comprises selecting, by the dialog system, the function group when a request to occupy the control key has been received for any function assigned to the function group.

11. The method of claim 9, further comprising determining, by the dialog system, the operating status of the use system by querying the use system.

12. The method of claim 9, wherein the use system automatically transmits the operating status to the dialog system.

13. The method of claim 9, wherein the first function relates to a switch-on function relative to a use system, and wherein the second function relates to a switch-off function inverse thereto such that, when the control key is operated while the use system is switched on, the switch-off function will be executed, and when the control key is operated while the use system is switched off, the switch-on function will be executed.

14. The method of claim 9, wherein the first and second functions relate to adjusting a use parameter, and wherein the method further comprises:
performing, by the dialog system, the second function of the function group in response to the control key operation when the use parameter has been adjusted according to the first function; and
performing, by the dialog system, the first function in response to the control key operation when the use parameter is adjusted to the second function.

15. The method of claim 9, wherein the use system comprises at least one of an air-conditioning system, a stereo system with a radio and other audio sources, and a navigation system.

16. A dialog system of a motor vehicle, wherein the dialog system comprises a control key occupied by a plurality of related functions of a hierarchical menu structure, where the plurality of related functions are assigned one or more function groups, and wherein the control key is further configured to be operated to execute one of the plurality of related functions, which is selected from the plurality of related functions based on an operating status of a corresponding use system in the motor vehicle, and wherein the control key is to be occupied, in response to an operating action of the control key having a continuous duration by a user of the motor vehicle, by all of the plurality of related functions assigned to a function group when any one of the functions assigned to said function group has been allocated to the control key.

17. The dialog system of claim 16, wherein the operating status of the use system is determined on the basis of a status model of the use system comprising the operating status.

18. The dialog system of claim 16, wherein the operating status of the use system is determined by querying the use system.

19. The dialog system of claim 16, wherein the plurality of related functions occupying the control key comprises a plurality of adjusting functions for adjusting a use parameter of the use system such that, when the control key is operated, a next adjusting function along a sequence of adjusting functions stored by the dialog system will be executed.

20. The dialog system of claim 16, wherein the plurality of related functions occupying the control key comprises a first adjusting function for adjusting the use parameter and a second adjusting function for adjusting the use parameter such that, when the control key is operated, the second adjusting function will be executed when the use parameter is adjusted according to the first adjusting function, and when the control key is operated, the first adjusting function will be executed when the use parameter is adjusted according to the second adjusting function.

21. The dialog system of claim 16, wherein the use system comprises at least one of an air-conditioning system, a stereo system with a radio and other audio sources, and a navigation system.

* * * * *